United States Patent [19]

Incorvia

[11] Patent Number: 4,744,948
[45] Date of Patent: May 17, 1988

[54] THIOL ESTER CORROSION INHIBITION SYSTEM

[75] Inventor: Michael J. Incorvia, Houston, Tex.

[73] Assignee: Texaco Inc., White Plains, N.Y.

[21] Appl. No.: 62,025

[22] Filed: Jun. 4, 1987

[51] Int. Cl.$^4$ .................. C23F 11/00; C23F 11/04; C09K 3/00

[52] U.S. Cl. .................................. 422/7; 422/12; 422/15; 422/16; 558/251; 558/252; 252/8.555; 252/390; 252/392; 252/395

[58] Field of Search .............. 558/251, 252; 252/8.555, 390, 392, 395; 422/7, 12, 15, 16

[56] References Cited

U.S. PATENT DOCUMENTS

| | | | |
|---|---|---|---|
| 2,320,287 | 5/1943 | Lieber et al. | 252/395 X |
| 2,474,603 | 6/1949 | Viles et al. | 252/8.55 |
| 2,763,612 | 9/1956 | Raifsnider et al. | 252/8.55 |
| 2,828,259 | 2/1958 | Wirtel et al. | 252/8.55 |
| 2,888,401 | 5/1959 | Hughes et al. | 252/8.55 |
| 2,912,386 | 11/1959 | Salzberg | 252/395 |
| 2,963,439 | 12/1960 | Eberhard | 252/395 X |
| 2,989,485 | 6/1961 | Eilers | 252/151 |
| 3,137,615 | 6/1964 | Ichikawa et al. | 558/251 |
| 3,330,672 | 7/1967 | Kroll et al. | 106/3 |
| 3,567,782 | 3/1971 | Warner et al. | 252/395 X |
| 3,697,221 | 10/1972 | Redmore et al. | 252/395 X |
| 3,755,176 | 8/1973 | Kinney et al. | 252/48.6 |
| 3,791,789 | 2/1974 | Dude Alink | 252/395 X |
| 3,929,852 | 12/1975 | Kydonieus et al. | 558/252 X |
| 4,159,901 | 7/1979 | Beestman et al. | 252/395 X |
| 4,188,297 | 2/1980 | Jayne et al. | 252/406 X |
| 4,350,600 | 9/1982 | Sharp et al. | 252/8.55 |
| 4,495,336 | 1/1985 | Hausler et al. | 252/8.55 |
| 4,608,191 | 8/1986 | Wu | 252/391 |

OTHER PUBLICATIONS

Trabanelli, Zucchi, Gullini, and Carssiti, "Inhibition of Acid Corrosion of Iron by Sulfur Organic Compounds," *Ninth International Congress on Metallic Corrosion*, pp. 602–605, (1969).

Chemical Abstract 88:40725, vol. 88, (1978), p. 188, "Inhibition of Corrosion by Water".

*Primary Examiner*—Matthew A. Thexton
*Attorney, Agent, or Firm*—Jack H. Park; Kenneth R. Priem; Harold J. Delhommer

[57] ABSTRACT

A series of water-dispersible corrosion inhibiting solutions and a method of using these solutions are disclosed which contain a thiol ester represented by the formula

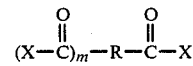

wherein R is an alkyl group having about 8 to about 22 carbon atoms, or an alkyl or alkylaryl group that is the nucleus of a dimerized fatty acid having about 28 to about 36 carbon atoms, X is a dithiol having about 1 to about 5 carbon atoms, m=0 where R has about 8 to about 22 carbon atoms, m=0 or 1 where R has about 28 to about 36 carbon atom. It has been discovered that the use of these thiol esters along or the addition of the thiol esters to organic inhibitor systems reduces corrosion.

11 Claims, No Drawings

THIOL ESTER CORROSION INHIBITION SYSTEM

BACKGROUND OF THE INVENTION

This invention relates to organic inhibitor treating solutions employed to reduce corrosion from harsh fluid environments. More particularly, the invention concerns treating solutions containing thiol esters.

Corrosion that occurs in an oil field environment is extremely complex and tends to attack all manner of metal equipment above and below ground. The principle corrosive agents found in the well fluids include hydrogen sulfide, carbon dioxide, oxygen, organic acids and solubilized salts. These agents may be present individually or in combination with each other. Valves, fittings, tubing, pumps, precipitators, pipelines, sucker rods and other producing equipment are particularly susceptible. Deposits of rust, scale, corrosion by-products, paraffin and other substances create ideal environments for concentration cells. Carbon dioxide and hydrogen sulfide induced pitting is encouraged by such deposits. Acidic condensate that collects on metal tubing will also cause pitting. Extreme temperatures and pressures in downhole environments further accelerate corrosion.

Very often as oil fields mature and enhanced recovery methods such as water flooding are instituted, the concentration of hydrogen sulfide in the well fluids increases dramatically. This increase in concentration and its related effect on the extent of pitting corrosion may make older fields economically unattractive due to to excessive corrosion costs.

Various sulfur compounds have been employed for many years in corrosion inhibitor systems, either alone or in combination with other components of inhibitor systems, such as amines, amides, surfactants, various aromatic compounds, phosphorus compounds and solubilizers. Dithiolanes having a specified formula of RR'COR" are proposed in U.S. Pat. No. 2,912,386 as corrosion inhibitors for acid attack on steel. According to the patent, R is a univalent organic radical having a specified formula, R' is a divalent hydrocarbon radical of less than 8-carbon atoms, and R" is OH, $NH_2$, lower alkoxy or an alkali metal such as Na. The preferred additive is 5-(1,2-dithiolan-3-yl)pentanoic acid. U.S. Pat. No. 3,791,789 discloses dithiolium compounds as corrosion inhibitors. And U.S. Pat. No. 3,697,221 describes the use of thionium derivatives, especially quaternary derivatives of dithiole-3-thiones as corrosion inhibitors.

U.S. Pat. No. 2,474,603 describes the use of corrosion inhibition systems containing a mixture of a butyl mercaptan along with sulfur containing compounds such as sulfides. A discussion on the use of alkyl mercaptans is also contained in Travanelli, Zucchi, Gullini and Carssiti, "Inhibition of Acid Corrosion of Iron By Sulfur Organic Compounds", *Ninth International Congress on Metallic Corrosion*, p. 602-5 (1969).

An aliphatic dithiol of the formula $HS(CH_2)_nX(CH_2)_mSH$ where X equals O, S or NH, and n and m equals 1-20, is disclosed in Chemical Abstracts 88: 40725p. A lubricating oil additive with excellent antioxidant anticorrosion properties is disclosed in U.S. Pat. No. 4,188,297. This lubricating additive is the reaction product of olefins with sulfur and certain mercaptans wherein the reaction product contains a high percentage of sulfur, such as about 25% sulfur. U.S. Pat. No. 4,495,336 discloses the use of mercapto-polycarboxylic acids as corrosion inhibitors.

Other examples of sulfur containing corrosion inhibitors include thiophosphates disclosed in U.S. Pat. No. 3,984,203 and various combinations of amido, and mercapto or polymercapto groups described in U.S. Pat. No. 4,332,967. U.S. Pat. No. 4,350,600 discloses a corrosion inhibitor for high temperature and high pressure gas wells containing a dialkyl disulfide along with a relatively high molecular weight aliphatic amine.

SUMMARY OF THE INVENTION

A series of water-dispersible corrosion inhibiting solutions are disclosed which contain a thiol ester represented by the formula

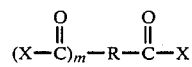

wherein R is an alkyl group having about 8 to about 22 carbon atoms, or an alkyl or alkylaryl group that is the nucleus of a dimerized fatty acid having about 28 to about 36 carbon atoms, X is a dithiol having about 1 to about 5 carbon atoms, m=0 where R has about 8 to about 22 carbon atoms, and m=0 or 1, where R has about 28 to about 36 carbon atoms. It has been discovered that the use of these thiol esters alone or the addition of the thiol esters to organic inhibitor systems reduces corrosion.

The corrosion inhibitor solvent is preferably a hydrocarbon, such as an aromatic solvent or an alcohol, but may be water. The thiol esters may be added to most organic inhibitor systems. They are especially effective in the presence of a fatty amine or a fatty amide in the inhibitor system.

Metal equipment can be protected through the use of the invention corrosion inhibiting solutions by contacting metal with an effective amount of inhibiting solution containing the thiol esters in a continuous exposure or batch treatment.

DETAILED DESCRIPTION

Perhaps the most costly problem in an oil field environment is corrosion of piping and equipment due to sweet and sour corrosion. It has been discovered that the addition of small amounts of a particular group of thiol esters effectively inhibits corrosion from both carbon dioxide and hydrogen sulfide as well as oxygenated brines.

The use of the invention system results in corrosion inhibition equal to or better than the best commercial inhibition system available. Corrosion inhibition rates of 90%-95% were achieved for sweet brine ($CO_2$) environments, 90%-98% for sour brine ($H_2S$) systems and 45%-50% for oxygenated brine systems.

The corrosion inhibiting solution of the invention contains about 10 rpm to about 10% by volume of the thiol esters in a solvent which may be water, brine, or a hydrocarbon. The thiol esters preferably deliver to the corrosion sites in a continuous treating solution containing about 10 ppm to about 1% by volume, most preferably about 10 ppm to about 200 ppm of the thiol ester having the formula

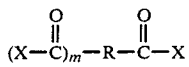

wherein R is an alkyl group having about 8 to about 22 carbon atoms, or an alkyl or alkylaryl group that is the nucleus of a dimerized fatty acid having about 28 to about 36 carbon atoms, X is a straight chain thiol or dithiol having about 1 to about 5 carbon atoms, $m=0$ where R has about 8 to about 22 carbon atoms, and $m=0$ or 1 where R has about 28 to about 36 carbon atoms. The term thiol ester as used herein is meant to refer to any compound satisfying this formula and definition.

Batch treatments of the thiol ester may also be employed. For batch treatments, the concentration of the thiol ester should be about 1% to about 10% by volume. The thiol esters, however, can be stored and shipped in solutions with concentrations ranging up to 50% by volume.

For batch treatments the thiol ester is preferably diluted in an aromatic or alcohol solvent with a filming additive such as a amide. Aromatic solvents are generally the most preferred solvents for batch filming purposes.

The thiol esters most preferred for use in the invention corrosion inhibiting solutions are those esters of the given formula wherein R is a fatty alkyl group containing about 14 to about 20 carbon atoms and X is a dithiol group containing about 2 to about 3 carbon atoms, and can be represented by the formula

The thiol esters are water dispersible and oil dispersible. With some hydrocarbon solvents, they are soluble. Thus, a wide range of solvents may be employed in the corrosion inhibiting system. The solvent may be water, brine, a hydrocarbon, or a hydrocarbon and brine mixture, most preferably, a hydrocarbon. Although the thiol esters may be solubilized, or at least dispersed, in water at low concentrations, problems can result with additives such as tall oil diamines, fatty amines, and fatty amides. Thus, hydrocarbon solvents are generally preferred. If the R group of the thiol ester is fully saturated, the thiol ester will be less soluble in water or alcohol solvents, as well as being more expensive to synthesize. Fatty acid chains are usually unsaturated, less costly, and more soluble in water and alcohol environments. It should be noted again that most organic inhibitors presently used in the oil field can be employed in the invention solution containing the thiol esters with improved corrosion results as long as the inhibitors are partially oil and water dispersible.

An aromatic hydrocarbon solvent or a mixture of aromatic solvents is preferred for filming applications, while a low molecular weight hydrocarbon solvent is preferred when a system having greater water dispersibility is desired. The low molecular weight solvents are preferably methanol, ethanol, propanol, isopropanol, butanol, isobutanol, pentanol, ethylene glycol, propylene glycol, Texaco EM fluid, which is a trademarked mixture of ethylene glycol and monomethyl ether sold by Texaco Chemical Co., a mixture of alcohol and water, mixtures of the above alcohols, and similar compounds. The use of glycols or a mixture of glycol and alcohol is preferred in cold environments because of the lower freezing point of the solvent when compared to cheaper lower molecular alcohols.

The thiol esters are especially effective when added to a corrosion inhibiting solution containing about 2 ppm to about 5% by volume of a amine, or most preferably a fatty amine or fatty amide. In most cases, the concentration will be in the range of about 10 ppm to about 1,000 ppm by volume. Some examples of these amines and amides are diethylenetriamine, tall oil diamines having about 16 to about 18 carbon atoms, tallow diethylenetriamine amide, dimethyl tallow benzyl quaternary ammonium chloride (an amine), other quaternary amines, and similar compounds.

The invention thiol esters may be synthesized by reacting a carboxylic acid with an agent such as thionyl chloride, phosphorus trichloride, or phosphorus pentachloride to produce an acid chloride of the carboxylic acid and then reacting that salt with a dithiol or a thiol to yield a thiol ester. These syntheses reactions must be carried out in a hydrocarbon, nonalcohol solvent, such as Texaco TAS, or toluene. TAS is a trademarked blend of aromatic solvents sold by Texaco Chemical Co.

The salt and ester reactions should not be done in an alcohol solvent because the thionyl chloride or acid chloride might react with the alcohol to make an ester of the alcohol. In fact, it is preferred to add a small amount of an alcohol such as isopropanol to the finished reaction mixture to react with any remaining acid chloride to remove unreacted acid chloride from the system. The syntheses reactions for producing a fatty thiol ester out of a fatty acid and 1,2-ethanedithiol are shown below.

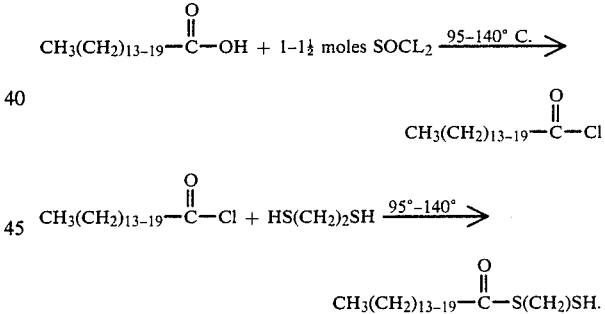

When a dimerized fatty acid ester is synthesized, the reaction product will consist of several different compounds. It is believed that the predominant reaction products will be

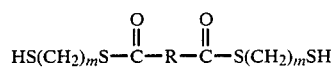

and

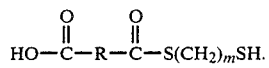

Cyclic compounds may also be formed. The fatty acid dimer may also dimerize to create a dimer of the dimer of fatty acid thioester. A mixture of dimerized fatty acids thioesters including these compounds is within the scope of the invention.

One test was performed wherein a small amount of ethylenediamine was added to the finished reaction mixture instead of isopropanol. The corrosion wheel tests gave the same excellent results for $H_2S$ and oxygenated environments and better results in sweet ($CO_2$) systems. It is believed the ethylenediamine and unreacted acid chloride yielded and amide which further reduced corrosion.

It is desirable to store and transport the invention corrosion solution with higher concentrations of thiol ester and organic inhibitor, such as about 1% to about 50% by volume. The thiol esters and preferred fatty amines and fatty amides are soluble or at least dispersible in water alone at the preferred treating concentrations of about 10 ppm to about 1%, and water-dispersible at the batch treating concentrations of about 1% to about 10%.

When higher concentrations are used for storage and transportation to save volume and shipping costs, the thiol esters are no longer water-dispersible and require some hydrocarbon solvent. It is preferred that the solvent contain at least some portion of a lower molecular weight alcohol to maintain solubility or at least dispersion of the thiol ester and any added organic inhibitor. This avoids physical handling problems in the field. Practically any alcohol may be used as a solvent, but lower molecular weight alcohols are preferred, primarily because of their low cost. Isopropanol and ethylene glycol are two of the most preferred alcohol solvents. Of course, certain environmental applications as well as batch filming treatments may require the use of other hydrocarbon solvents.

The corrosion inhibiting solutions of the invention which contain the instant thiol esters may be employed in different industries where metals come under attack. They are particularly effective in solving the corrosion problems which result from sweet and sour systems as well as oxygenated brines. Since the solutions offer substantial improvement over present inhibitor systems, they may be used to protect downhole piping and equipment in situations such as subsurface water injection for pressure maintenance, water disposal systems, or even drilling applications, as well as in aboveground, oil or water flow lines and equipment.

The invention solution may be employed in both general methods of inhibiting solution treatment, continuous injection and batch. However, in batch applications the thick filming formulation in an aromatic hydrocarbon solvent is preferred. Either method, continuous injection or batch, permits the organic inhibitor solution containing the thiol ester to contact the metal to be protected and form an organic barrier over the metal.

The effectiveness of a given organic inhibitor system generally increases with the concentration, but because of cost considerations most solutions when fully diluted in their working environment must be effective in quantities less than about 0.01% by weight (100 ppm). The invention solution is effective throughout the range of about 10 ppm to about 200 ppm in a continuous injection method.

If a batch method is employed, a slug of inhibiting solution containing the thiol ester should be injected into a closed system with a concentration of preferably about 1% to about 10% in the inhibiting solution. Of course, various surfactants, solubilizers and organic inhibitors may be added to the inhibiting solution to enhance its film-forming ability and effectiveness. The solution should be allowed to remain in contact with the metal to be protected for a sufficient time to form a durable film. The contact time period is preferably at least 12 hours, preferably 24 hours. Afterwards, normal production or flow of fluids should be resumed, flushing out excess inhibitor solution. The batch treatment should be repeated when necessary to maintain film durability over the metal to be protected.

At present, an industry established procedure for testing oil field corrosion inhibitors does not exist. Because of widely varying corrosion conditions in the oil field, it is impractical to establish a universal standard laboratory test. But it is desirable to have tests that are easily duplicated and can approximate the continuous type of liquid and gas exposure that occurs in wells and flow lines in the oil field. One test simulating field usage has achieved some following in the industry. The continuous exposure procedure set forth in January 1968 issue of "Material Protections" at pages 34-35 was followed to test the subject invention. The test offers an excellent indication of the ability of corrosion inhibitors to protect metals immersed in either sweet or sour fluids.

The following examples will further illustrate the novel corrosion treating solutions of the present invention containing said thiol esters. These examples are given by way of illustration and not as limitations on the scope of the invention. Thus, it should be understood that materials present in the corrosion treating solutions may be varied to achieve similar results within the scope of the invention.

EXAMPLES

General Test Procedure

The metal specimens were immersed in sweet or sour fluid environments for seventy-two (72) hours to approximate continuous exposure conditions in the oil field. The sweet fluid test environment was established by gassing the test solution with carbon dioxide. A sour fluid test environment was created by bubbling hydrogen sulfide through the test solution. The oxygenated brine environment was duplicated with air. The specimens were tested in carbon dioxide, hydrogen sulfide and oxygenated brine environments with and without the claimed thiol esters.

The metal test specimens were cold-rolled, mild steel coupons which measured 3 inches by 0.5 inches by 0.005 inches. These coupons were initially cleaned in order to remove any surface film, dried and then weighed.

Four ounce bottles were filled with two types of test solutions. The first simulated an oil-brine environment and consisted of 10 milliliters of Texaco EDM fluid, a Texaco trademarked lube oil cut having an API gravity of about 39°, 90 milliliters of a 10% synthetic brine and 1 milliliter of dilute (6%) acetic acid. The synthetic brine contained 10% sodium chloride and 0.5% calcium chloride by weight. The second test solution simulated a brine environment and was composed of 100 milliliters of the same 10% synthetic brine and 1 milliliter of dilute acetic acid. The oil-brine and brine test solutions were then gassed for 5 to 10 minutes with carbon dioxide to create a sweet test environment or hydrogen sulfide to create a sour test environment. The solution gassing was designed to remove any dissolved oxygen as well as create the sweet or sour environment. In the tests designed to duplicate the corrosive environment of oxygenated brines, all test systems were sparged with air to insure uniform levels of oxygen from day to day and test to test.

The stock solution of the thiol ester systems tested comprised 70% Texaco EM Fluid, 15% thiol ester, and 15% amine, or 85% Texaco EM Fluid and 15% thiol ester. The stock solutions were diluted to the 25 ppm, 30 ppm, 50 ppm, 100 ppm and 500 ppm concentrations as specified. Next, a measured concentration of the thiol ester and any other additives were placed in the bottles.

The steel test coupons were then placed within the bottles. The bottles were capped and mounted on the spokes of a 23 inch diameter, vertically mounted wheel and rotated for 72 hours at 30 rpm inside an oven maintained at 49° C. for $H_2S$ and oxygenated brine environments and 71° C. for $CO_2$ environment. The coupons were removed from the bottles, washed and scrubbed with dilute acid for cleaning purposes, dried and weighed. The corrosion rate in mils per year (mpy) was then calculated from the weight loss. One mpy is equivalent to 0.001 inches of metal lost per year to corrosion. Additionally, the test coupons were visually inspected for the type of corrosive attack, e.g., hydrogen blistering, pitting and crevice corrosion or general corrosion.

EXAMPLES 1-6

A 1,2-ethanedithiol ester was synthesized from a commercial oleic acid sold under the trademark of Emersol 210 by Emery Industries. 12 grams of Emery 210, 21 milliliters of Texaco TAS, a blend of aromatic solvents marketed under that trademark by Texaco Chemical Co., and 3.8 milliliters of thionyl chloride ($SOCl_2$) was added to a round bottom flask fitted with a condenser. The mixture was heated to 125° C. for 45 minutes. 3.6 milliliters of ethanedithiol was added to this hot reaction mixture.

The reaction mixture was maintained at 125° C. for another hour. Aliquots of this reaction mixture (the Inhibitor 1 formulation of Table 1) were diluted in a solvent of TAS, or isopropanol (IPA) and approximately 1% by weight of Surfonic N-150. Surfonic N-150 is a trademarked reaction product of ethylene oxide with nonylphenol having an average of 15 ethylene oxide groups sold by Texaco Chemical Co. An amide or amine was added to given aliquots of Inhibitor 1 to form the corrosion inhibition systems for the examples of Table 1. The amines added to Inhibitor 1 were a tall oil diamine sold under the trademark Adogen ® 551 by Sherex Chemical Co. Inc. for Examples 1-4 and diethylenetriamine for Example 5. Adogen ® 551 is a mixture of mostly $C_{18}$ diamines with an approximate combining weight of 170, approximate molecular weight of 323, and a total amine value of anbout 320 to 340. A tallow diethylenetriamine amide sold under the trademark Witcamine 210 by Witco Chemical Co. was added to Example 6.

The corrosion inhibitor systems of Examples 1-5 performed admirably. Inhibition was 94%-96% in sour environment and 90% plus in sweet environments for the Example 1 and 2 systems. Thus, outstanding results were achieved even at a 25 ppm concentration for this inhibitor systems. The oxygenated brine tests indicated 50% protection for the thiol ester systems tested, equal to the best commercial products available.

TABLE 1

1,2-Ethanedithiol Ester Corrosion Inhibition Systems in Continuous Exposure Wheel Test (Corrosion Rates in mpy)

| Examples | Inhibitors | Dosage Level | $CO_2$ | $H_2S$ | Air |
|---|---|---|---|---|---|
| 1 | Inhibitor 1 in a 1:2 Ratio with Adogen ® 551 in TAS/N-150 | 25 ppm | 0.8 | 3.2 | — |
| 2 | Inhibitor 1 in a 1:0.05 Ratio with Adogen ® 551 in TAS/N-150 | 100 ppm | 1.0 | 2.1 | — |
| 3 | Inhibitor 1 in a 1:1 Ratio with Adogen ® 551 in TAS/N-150. | 30 ppm | 1.5 | 4.8 | — |
| 4 | Inhibitor 1 in a 1:1 Ratio with Adogen ® 551 in TAS/N-150 | 500 ppm | — | — | 10.7 |
| 5 | Inhibitor 1 in a 1:0.1 Ratio with Diethylenetriamine in IPA/N-150 | 500 ppm | 1.1 | 5.2 | 12.0 |
| 6 | Inhibitor 1 with tallow diethylenetriamine amide in IPA/N-150 | | 1.0 | 3.0 | 9.6 |

EXAMPLES 7-9

Following the procedure used to prepare the Inhibitor 1 in Examples 1-6, stearic acid was reacted with a 1,3-propanedithiol in TAS solvent and 1,2-ethanedithiol in IPA/N-150 solvent, and tested with the continuous exposure corrosion wheel test of Examples 7-9. The systems of Examples 7-9 did not perform as well as the other thiol ester systems. However, the Example 7 system provided about 90% inhibition in a $CO_2$ environment. The results are listed in Table 2 below.

TABLE 2

Thiol Ester Corrosion Inhibitor Continuous Exposure Wheel Tests (Corrosion Rates in mpy)

| Examples | Inhibitors | Dosage Lever | $CO_2$ | $H_2S$ | Air |
|---|---|---|---|---|---|
| 7 | Stearic acid 1,3-propanedithiol ester in TAS | 25 ppm | 1.0 | 10 | 48 |
| 8 | Stearic acid 1,2-ethanedithiol ester in IPA/N-150 | 25 ppm | 4.0 | 13 | 39 |
| 9 | Stearic acid 1,2-ethanedithiol ester in IPA/N-150 | 50 ppm | 3.4 | 11 | 49 |

EXAMPLES 10-12

A 1,3-propanedithiol ester was prepared according to the procedure of Examples 1-6. In this case, EMPOL ® 1014, a trademarked dimer acid sold by Emery Industries, prepared by dimerizing a $C_{18}$ fatty acid, was reacted with 1,3-propanedithiol in toluene. It is believed that the chief dimer compound of EMPOL 1014 is a unsaturated six member ring with branched chains and two carboxylic acid groups. It is a 97% dimer, 3% trimer mixture with an average molecular weight of about 565.

The continuous exposure corrosion wheel tests were performed in sweet, sour and oxygenated environments.

The same compound was tested at 25 ppm, 50 ppm and 100 ppm. The results are listed below in Table 3.

The dimer acid propanedithiol ester test runs indicated very good protection of about 90% inhibition for sweet environments and about 50% inhibition in oxygenated brines. The oxygenated brine protection was achieved at concentration levels as low as 25 ppm, in contrast with similar protection provided by the thiol ester systems of Examples 4 and 5 at about 500 ppm. The systems of Examples 10–12, however, provided poor $H_2S$ protection.

TABLE 3

Thiol Ester Corrosion Inhibitor
Continuous Exposure Wheel Tests
(Corrosion Rates in mpy)

| Examples | Inhibitors | Dosage Lever | $CO_2$ | $H_2S$ | Air |
|---|---|---|---|---|---|
| 10 | Dimer acid 1,3-propanedithiol ester in toluene | 25 ppm | 2.5 | 13 | 10 |
| 11 | Same | 50 ppm | 2.1 | 28 | 9.4 |
| 12 | Same | 100 ppm | 0.9 | 39 | 9.5 |

EXAMPLE 13

A 1,2-ethanedithiol diester was synthesized from a commercial dimer acid sold under the trademark of EMPOL 1014 by Emery Industries. 12 grams of Emery 1014, 23 milliliters of Texaco TAS, a blend of aromatic solvents marketed under that trademark by Texaco Chemical Co., and 3.7 milliliters of thionyl chloride ($SOCl_2$) was added to a round bottom flask fitted with a condenser. The mixture was heated to 125° C. for 1 hour. 3.6 milliliters of ethanedithiol was added to this hot reaction mixture.

The reaction mixture was maintained at 125° C. for 1½ hours. Aliquots of this reaction mixture were diluted in a solvent if isopropanol (IPA) and approximately 1% by weight of Surfonic N-150. Witcamine 210 tallow diethylenetriamine amide was added to a given amount of the dimerized fatty acid thioester to form a corrosion inhibitor system. The corrosion rates were 0.8 mpy for $CO_2$ exposure, 3.1 mpy for $H_2S$ exposure and 10.2 mpy for oxygenated air exposure. Thus, the dimerized fatty acid ester with amide provided excellent corrosion control in all environments.

Other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A water-dispersible corrosion inhibiting solution, comprising:
   a solvent; and
   about 10 ppm to about 10% by volume of a thiol ester, said thiol ester represented by the formula

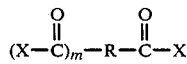

wherein R is an alkyl group having about 8 to about 22 carbon atoms, or an alkyl or alkylaryl group that is the nucleus of a dimerized fatty acid having about 28 to about 36 carbon atoms, X is a dithiol having about 1 to about 5 carbon atoms, m=0 where R has about 8 to about 22 carbon atoms, and m=0 or 1 where R has about 28 to about 36 carbon atoms.

2. The corrosion inhibiting solution of claim 1, wherein the solvent is water.

3. The corrosion inhibiting solution of claim 2, wherein the water is a brine.

4. The corrosion inhibiting solution of claim 1, wherein the solvent is a hydrocarbon.

5. The corrosion inhibiting solution of claim 1, wherein the solvent is an alcohol selected from the group consisting of ethylene glycol, propylene glycol, methanol, ethanol, propanol, butanol, pentanol and mixtures thereof.

6. The corrosion inhibiting solution of claim 1, wherein the solvent is a hydrocarbon and brine mixture.

7. The corrosion inhibiting solution of claim 1, wherein R is an alkyl group having about 14 to about 20 carbon atoms and X is a dithiol having about 2 to about 3 carbon atoms.

8. The corrosion inhibiting solution of claim 1, wherein the solvent is an aromatic hydrocarbon solvent.

9. A water-dispersible corrosion inhibiting solution, comprising:
   an hydrocarbon solvent;
   about 10 ppm to about 200 ppm by volume of a thiol ester, said thiol ester represented by by the formula

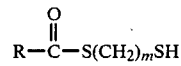

wherein R is an alkyl group having about 14 to about 20 carbon atoms and m is about 2 to about 3; and
   about 10 ppm to about 1,000 ppm by volume of a fatty amine or fatty amide.

10. A method of protecting metals from corrosive agents in hydrocarbon and aqueous fluids which comprises contacting the metal with an effective amount of a thiol ester represented by the formula

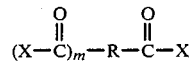

wherein R is an alkyl group having about 8 to about 22 carbon atoms, or an alkyl or alkylaryl group that is the nucleus of a dimerized fatty acid having about 28 to about 36 carbon atoms, X is a dithiol having about 1 to about 5 carbon atoms, m=0 where R has about 8 to about 22 carbon atoms, and m=0 or 1 where R has about 28 to about 36 carbon atoms.

11. The method of claim 10, wherein the thiol ester is mixed with fluids so that a concentration of about 10 ppm to about 10% by volume of the thiol ester continuously contacts the metal.

* * * * *